Figure 1:
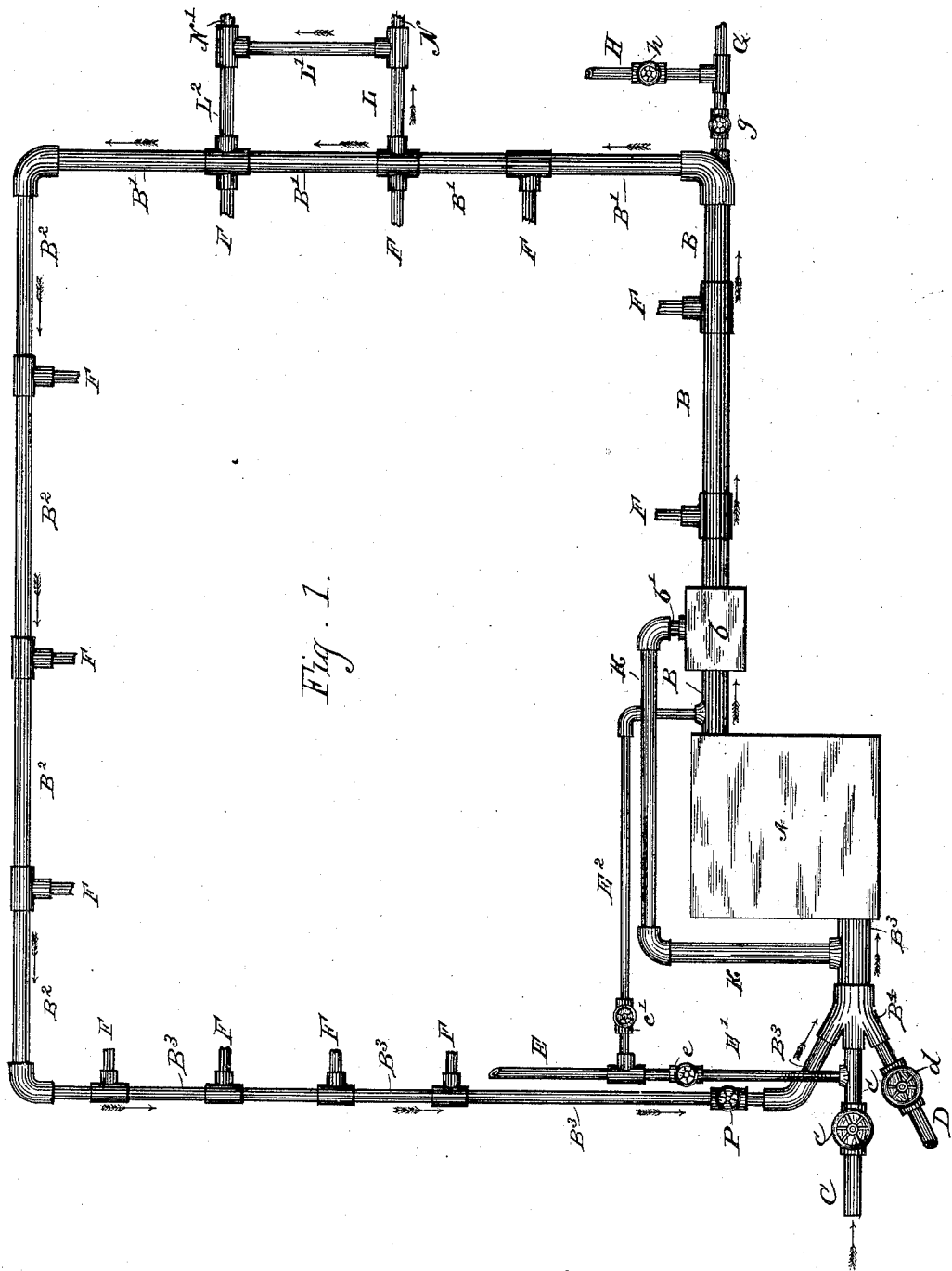

(No Model.) 2 Sheets—Sheet 1.

G. E. BENNINGHOFF.
APPARATUS FOR AND PROCESS OF SUPPLYING AIR AND GAS.
No. 344,616. Patented June 29, 1886.

WITNESSES
John C. Miller
Percy White

INVENTOR
George E. Benninghoff
By J. W. F. _____
Attorney

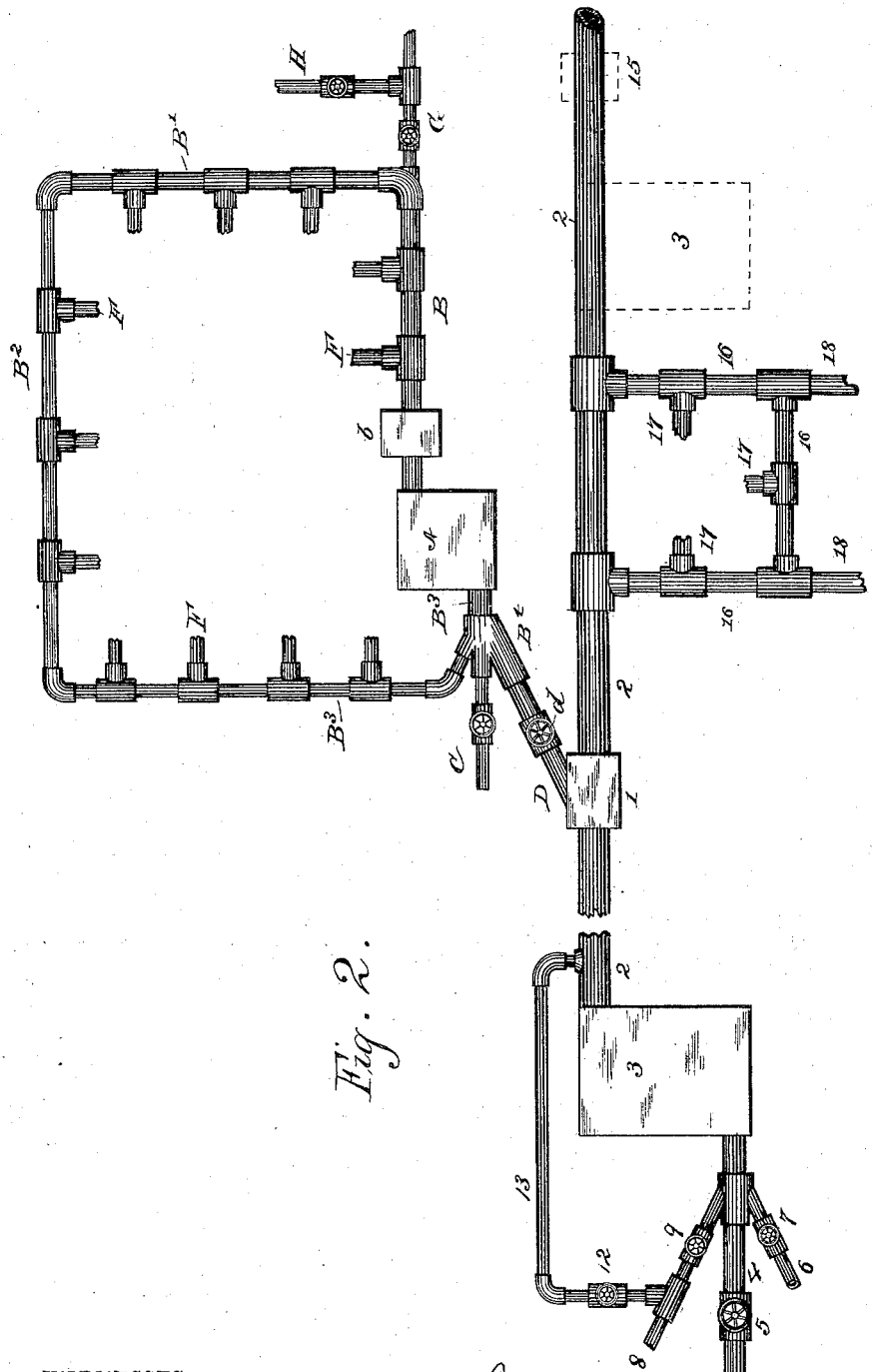

UNITED STATES PATENT OFFICE.

GEORGE E. BENNINGHOFF, OF KENDALL CREEK, PENNSYLVANIA.

APPARATUS FOR AND PROCESS OF SUPPLYING AIR AND GAS.

SPECIFICATION forming part of Letters Patent No. 344,616, dated June 29, 1886.

Application filed February 6, 1886. Serial No. 190,936. (No model.)

*To all whom it may concern:*

Be it known that I, GEORGE E. BENNINGHOFF, a citizen of the United States, residing at Kendall Creek, in the county of McKean and State of Pennsylvania, have invented certain new and useful Improvements in Heat and Light Producing Appliances and Processes; and I do hereby declare the following to be a full, clear, and exact description of the invention, such as will enable others skilled in the art to which it appertains to make and use the same.

The object of this improvement is to reduce the cost of light and heat for domestic and business purposes by means of a process of mixing and a suitable method of transmitting mixed air and gas through a circuit for receiving the same in a state previously mixed by said process, and transmitting it through a circuit and distributing the same in a mixed state adapted to efficient combustion, and the economical production of light and heat for general purposes. These results are attained by the process herein set forth and the means illustrated in the drawings herewith filed as part hereof, in which the same letters of reference denote the same parts in the different views.

Figure 1 is a plan view representing the mechanism for mixing gas and air and transmitting and distributing the same through a circuit in a mixed state in accordance with the process and method of my improvement. Fig. 2 is a plan view representing the principle features of the mechanism shown in Fig. 1, connected with and arranged to receive from a distinct main and transmit in a mixed state air and gas previously mixed and transmitted through such main extending to and through as many different localities as may be desired.

Referring to Fig. 1, A is an air engine or pump of any suitable construction. B represents a main beginning at the issue side of the air-pump A and continued, by means of pipes B' B² B³, through or around a building, factory, town, or city, and back to the suction side of the pump, substantially as shown. C is an air-pipe or conduit provided with a controlling-valve, c, and arranged to communicate with the pumps A through a suitable joint, B⁴, and pipe B³. The return part B³ of the circuitous mains is provided with a controlling-valve, B, for a purpose hereinafter set forth. E represents a pipe connected with a gas conduit or gasometer, and provided with an extension, E', having a controlling-valve, e, and arranged to deliver gas into the conduit C, and also an extension, E², provided with a controlling-valve, e', and arranged to deliver gas into the main forward of or at the issue side of the pump A. K is a conduit connected with the pump through the conduit and main B³, and arranged to communicate with the reservoir b, as shown at b', through a suitable automatically-regulated valve, (not shown,) but which may be located either in the reservoir or in the said conduit, for a purpose hereinafter set forth. F F are conduit-pipes suitably connected with the pipes composing the main and arranged to conduct the mixed air and gas into connecting stoves and furnaces for heating purposes or burners for illuminating purposes, or both, as occasion may require. G is an air and gas conduit provided with a controlling-valve, g, and suitably extended from the main, for a purpose hereinafter explained. H is an air-conduit intersecting conduit G and provided with a controlling-valve, h. L L' L² is a conduit extended from and returned to the circuitous main B B' B² B³. N N' represent conduits extended from the conduit L L' L², which may be tapped in various places, as occasion may require. The circuitous main may be provided with as many conduits extended from and returned thereto, as shown, as may be deemed advisable, for a purpose hereinafter set forth. D is a conduit intersecting the circuitous main, substantially as shown, through a suitable joint, B⁴, and provided with a valve, d, for a purpose hereinafter explained. The main may be provided with a reservoir, b, for equalizing the pressure in the main, which may be composed of gradually-reduced pipes, as shown, in order to equalize the pressure in the parts of the main farthest from the issue side of the pump A.

Referring to Fig. 2, 3 is an air-engine or pump, of any suitable construction. 4 is an air-conduit provided with a controlling-valve, 5, and arranged to communicate through a suitable joint, 10, with the air-pump 3. 6 is a gas-conduit provided with a controlling-valve, 7, and arranged to connect with a gasometer and communicate with the air-pump, substantially as shown, through the air-conduit intersecting joint 10. 8 is a gas-conduit provided with a controlling-valve, 9, and arranged to connect with a gasometer and communicate with the air-pump, substantially as shown, through the said air-conduit intersecting joint. 2 is a line-main beginning at the issue side of the air-pump 3, and extended thence to and through different localities as far as may be deemed advisable, for a purpose hereinafter explained. 13 is a gas-conduit connecting the conduit 8 with the main 2, adjacent to or otherwise beyond the issue side of the air-pump. D is a conduit connecting the main 2 through a reservoir, 1, and suitable joint, $B^4$, with the air-pump A and main or conduit B B' $B^2$ $B^3$. The main 2 is provided with a reservoir, as shown at 1, for equalizing the pressure in the main, and may be provided with a series of air-pumps and reservoirs, as indicated by the dotted profile lines at 3 and 15, for a purpose hereinafter set forth. 16 16 16 is a conduit extended from and returned to the main 2. 17 and 18 represent minor conduits extended from the conduit 16. The main 2 may be provided with as many conduits extended from and returned thereto, as shown, as may be necessary for the purpose of supplying buildings or towns along the line of the same without employing an air-pump to maintain the movement necessary to preserve a suitable mixture of the air and gas.

The mechanism shown in Fig. 1 is adapted to connect with a gas-main through the conduit E, and to mix air and gas and transmit the same in a mixed state adapted to illuminating and heating purposes in general for hotels, manufacturing establishments, or other buildings. The conduit G, intersecting the main, as shown, is for the purpose of conducting the mixed gas and air into a forge or furnace located outside of, or at a distance from, the building in which the main conduit is located, or at a distance from said conduit in the direction of the conduit G. The pipe G is provided with intersecting pipe H, having valve $h$ for the purpose of admitting more or less air into a furnace connected with the pipe G, as occasion may require for regulating the combustion in such furnace. A suitable number of furnaces may be connected with the main in the same manner, and located either outside of the circuit, as indicated, or within the same, through conduit-pipes F or otherwise; or the main may be located centrally and tapped on both sides.

The mechanism shown in Fig. 1 is also adapted to direct connection with a gasometer, and to mixing and transmitting gas and air in a mixed state adapted to general illuminating and heating purposes through a town or city.

In the application of the mechanism to illuminating or heating purposes for a hotel, manufacturing establishment, or other building in town or city provided with gas-works, the mechanism is connected with a gas-conduit through the pipe E and its extensions E' $E^2$, by means of which gas is let into the air-conduit C on the suction side of the pump and into the circuitous conduit at the issue side of the pump, one or both, as may be necessary for suitably mixing the gas and air. The flow of gas through the pipes E' $E^2$ may be controlled by the valves $e$ $e'$. The valve $c$ of the air-conduit C is first opened more or less to admit air into the pump A, which is next put in motion. One or both of the valves $e$ $e'$ are then opened more or less, and the pump will suck in, mix, and force the gas and air in a mixed state through the main or conduit B B' $B^2$ $B^3$ and the conduits intersecting the same. Minor conduits L L' $L^2$ and N N' may be extended from the main through a building or buildings along the line of the main and returned to the latter, as shown, and such building or buildings thereby supplied with suitably-mixed air and gas without employing an air-pump in such minor conduit to maintain the movement necessary to preserve a suitable mixture of the air and gas. By reason of the main or conduit B B' $B^2$ $B^3$ returning to and being connected with the suction side of the pump A, a continuous movement and suitable mixture of the gas and air in a state adapted to illuminating and heating purposes in general is maintained throughout the main. The amount of gas and air necessary to produce economical and efficient combustion is let in and controlled by the valve $c$ in the air-conduit C. The admission of gas is controlled by the valves in the gas-conduits connecting with the pump and the main. Any suitable number of air-induction pipes and gas-induction pipes may be used, according to the quantity and distance to be supplied or other circumstances of the case. Gas and air are supplied to the pump 3 by the pipes and valves shown, or more, if desired, and are regulated, mixed, and forced through the main 2, in a state adapted to illuminating and heating purposes in general.

In the operation the regulation of the mixing and supplying the mixed gas and air will be substantially automatic, as the constant pressure in the main or circuit will allow only so much to enter as is necessary to supply the consumption of the mixture.

The gas-conduit $E^2$ is to be used when the gas-pressure is greater than the backward pressure in the main, in which case the gas may be simultaneously let into the pump through the pipes E' and C, and into the main through the pipe $E^2$. The reservoir $b$ may be a weighted gas-tank for equalizing the pressure, if desired.

By reason of the conduit K connecting with the pump A through the pipe B and with the reservoir $b$, and the automatically-regulated valve mechanism provided for the same, should the pressure in the reservoir become greater than is desirable the valve mechanism will allow the mixed air and gas to return to the suction side of the pump A through the pipe B³, and re-enter and be remixed and redistributed in the main.

A suitably-proportioned mixture of the gas and air being necessary to efficient or perfect combustion, the mixture is to be kept slightly surcharged with a preponderance of gas in order that a slight addition of air will be necessary, and in order that the mixture may be modified and the combustion regulated, by supplying the necessary amount of air to the stoves or furnaces by draft courses for the same, suitably arranged for directing air into the same, as may be required for balancing or equalizing the preponderance of gas. The preponderance of either gas or air in the mixture will be indicated by a peculiar noise during combustion, which noise will change when the proper addition of air is supplied in the manner stated, which will be indicated by a peculiar feeling imparted to the hand operating the valve regulating the fire. The same process and method may be applied to supplying a town or city with air and gas in a mixed state adapted to illuminating and heating purposes in general by providing the same with suitably-extended mechanism arranged to operate in the manner specified, and connected to a gasometer through the pipes D and E, one or both, or any suitable number of additional pipes or gasometers.

The main 2, (shown in Fig. 2,) provided with air and gas mixing and forcing and distributing mechanism, as shown and specified, being adapted to transmitting gas and air in a suitably-mixed state from one locality to another, the process and method herein described may be applied to manufacturing establishments or other buildings, towns, or cities along the route of the same by providing them with the mixed air and gas transmitting mechanism, (shown in Fig. 1,) and connecting the same with the main 2, substantially in the manner shown at D, or with the conduits extended from and returned to the main, as shown.

Air and gas in a suitably-mixed state for the purposes stated may be transported any distance desired by means of a main provided at suitable distances with reservoirs and pumps for receiving and transmitting the same. Such main may end in a reservoir or connect with conduits for supplying a manufacturing establishment or other building, a town, or city with mixed air and gas, as circumstances may require.

What I claim as new, and desire to secure by Letters Patent, is—

1. The within-described method of mixing gas and air and transmitting and distributing the same in a mixed state and maintaining the mixture in a state adapted to illuminating and heating purposes, such method consisting in simultaneously drawing gas and air through intersecting conduits into a suitable mixing and forcing engine, and forcing and supplying a portion for use through a main, beginning in the issue side of the mixing and forcing engine and extended into a circuitous direction back to the suction side of the mixing and forcing engine, and delivering the surplus of the mixed gas and air into the mixing and forcing engine, and thereby maintaining a continuous movement of the mixture, substantially as specified, for the purpose set forth.

2. In a system for distributing matter for illuminating and heating purposes, the combination of a suitable air and gas mixing and forcing engine, the main provided with suitable distributing-conduits, and extended from the issue side of the mixing and forcing engine back to and arranged to communicate with the mixing and forcing engine through its suction side, the air-induction conduit, the conduits for admitting gas into the air-induction conduit and into the main at the issue side of the mixing and forcing engine, the reservoir, and the conduit connected with the reservoir and arranged to communicate with the main at the suction side of the mixing and forcing engine, substantially as specified, for the purpose set forth.

3. In a system for distributing matter for illuminating and heating purposes having a circuitous main beginning in the issue side and ending in the suction side of a mixing and forcing engine, as specified, and provided with a reservoir, as shown, the conduit connected with the reservoir and arranged to communicate with the main at the suction side of the mixing and forcing engine, in combination with the main and reservoir, as and for the purpose set forth.

4. In a system for distributing matter for illuminating and heating purposes, the transmitting-main provided with air and gas mixing and forcing mechanism, as shown and specified, in combination with a circuitous main provided with air and gas mixing, forcing, and distributing mechanism, substantially as and for the purpose set forth.

5. In a system for distributing matter for illuminating and heating purposes, the combination of the direct transmitting main provided with conduits extended from and returned thereto, as shown and described, suitable mixing and forcing mechanism, the air-induction conduit arranged to communicate with the suction side of the mixing and forcing engine, the gas-conduits arranged to communicate with the mixing and forcing engine through the air-induction conduit, and the gas-conduit connecting the gas-induction conduit with the direct transmitting-main at the issue side of the mixing and forcing engine, substantially as specified, for the purpose set forth.

In testimony whereof I affix my signature in presence of two witnesses.

GEORGE E. BENNINGHOFF.

Witnesses:
GEORGE J. WOLF,
JAMES GEORGE.